Jan. 11, 1966  W. S. KLEINBACH ET AL  3,229,110
CONTROL OF POWER INTERCHANGE BETWEEN ELECTRIC SYSTEMS
Filed Aug. 1, 1962  12 Sheets-Sheet 1

INVENTORS
WILMER S. KLEINBACH
HARRY G. STEWART, JR.
BY
ATTORNEY

INVENTORS
WILMER S. KLEINBACH
HARRY G. STEWART, JR.
BY
ATTORNEY

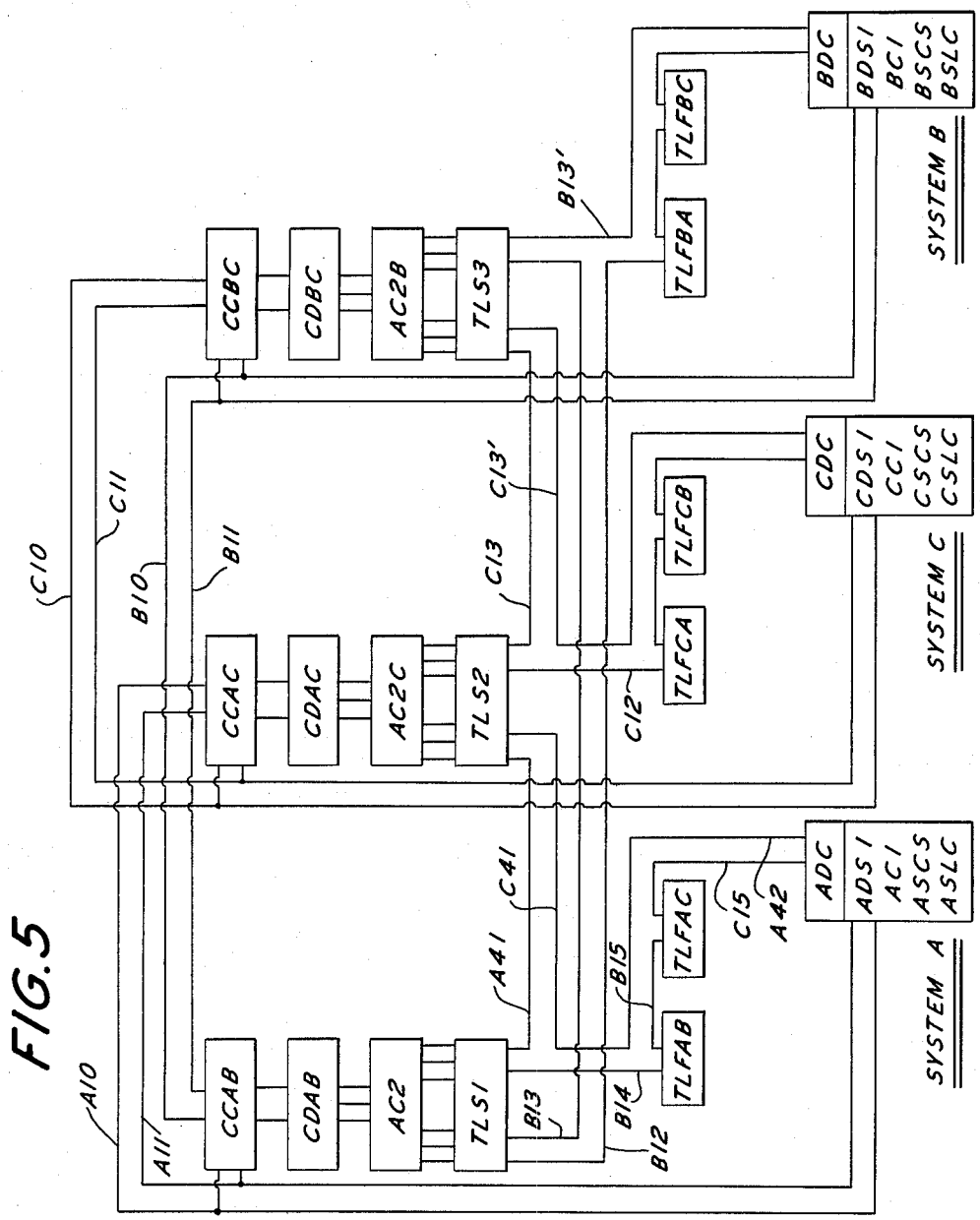

INVENTORS
WILMER S. KLEINBACH
HARRY G. STEWART, JR.
ATTORNEY

# United States Patent Office 3,229,110
Patented Jan. 11, 1966

3,229,110
CONTROL OF POWER INTERCHANGE BETWEEN ELECTRIC SYSTEMS
Wilmer S. Kleinbach, Norristown, and Harry G. Stewart, Jr., Radnor, Pa. (both c/o Philadelphia Electric Co., 1000 Chestnut St., Philadelphia, Pa.)
Filed Aug. 1, 1962, Ser. No. 214,113
16 Claims. (Cl. 307—57)

This invention relates to the control of power interchange between electric systems.

Electric power generating systems customarily include a plurality of generating units which may be hydroelectric, or thermal, with various capabilities of response to demand, and with different incremental costs of power produced. Various automatic load dispatch systems for generating units have been employed within particular systems. The simplest dispatch system develops a single signal, identified as an "area requirement" or "error signal," representing the difference between the load and the generation, and sends to the generators a signal calling for increase or decrease of generation so as to match generation with load.

A more improved load dispatch system takes into account the generating cost of each unit of the system whereby a system dispatcher selects the unit with the lowest cost for raising output and that with the highest cost for lowering output in accordance with an area requirement signal.

A still more improved load dispatch system utilizes incremental costs of generating power, in a digital or analog computer which in turn automatically changes generation on the system in accordance with an area requirement signal.

In addition to the interconnection of different generating units within a company system, interconnections between different systems for interchanging power have been set up which cover wide geographical areas.

The present practices for interchanging power between electric systems involve procedures which are manually performed. The system load dispatchers of the various systems mutually agree upon a fixed amount of power interchange for each succeeding hour, based upon estimated incremental energy costs and replacement values.

At a prearranged time, the scheduled or agreed upon interchange is hand set in tie line schedule setters on the automatic control consoles of each of the systems. Irrespective of actual running costs, which may vary due to unpredictable load conditions or generation conditions, the agreed upon schedule is generally maintained throughout the hour.

Each system load is different in its characteristics and variations and each system has an obligation to meet its load.

The control of power interchange between systems thus places a severe burden upon the system dispatchers, not only in meeting the system load, but in estimating hourly costs, in establishing mutually agreed upon schedules, and also in setting the tie line schedules manually.

It is the principal object of the present invention to provide for the control of power interchange between electric systems in a simple but effective manner which will alleviate difficulties presently encountered in power interchange.

It is a further object of the present invention to provide for the control of power interchange between electric systems which will result in appreciable economies due to the most economic dispatch of power and which will alleviate the burden of the system dispatchers of estimating hourly costs and establishing and manually setting tie line schedules.

It is a further object of the present invention to provide for the control of power interchange between electric systems in which an instantaneous comparison is made between energy costs of the respective systems, and an automatic control is provided for the interchange of power between the systems based upon such comparison.

It is a further object of the present invention to provide for the control of power interchange between electric systems in which an instantaneous and continuous comparison is made of the incremental energy cost of each of the systems, and, if and when a cost difference exists, to make an appropriate change automatically in the scheduled interchange between the systems, so as to return the systems to equal cost, within the limits of the tie line capabilities.

It is a further object of the present invention to provide for the control of power interchange between electric systems based upon actual instantaneous energy costs, rather than estimated hourly costs, thereby resulting in substantial reduction of cost of generation.

It is a further object of the present invention to provide for the control of power interchange between electric systems in which a plurality of components are employed many of which are of known type but are connected in such a manner as to provide for the desired control.

It is a further object of the present invention to provide improvements in the control of power interchange between electric systems in which the burden on the respective system dispatchers of predicting incremental costs and arranging tie line schedules is eliminated.

It is a further object of the present invention to provide for the control of power interchange between interconnected electric systems at different locations in which simple but effective methods and apparatus are employed for automatically comparing the instantaneous system energy costs and automatically controlling the interchange of power between the systems in an economically advantageous manner based upon such comparisons.

It is a further object of the present invention to provide for the control of power interchange between electric systems in which the system loads are accommodated without impairment of the obligation of each system to meet its own load.

Other objects and advantageous features of the invention will be apparent from the description and claims.

The nature and characteristic features of the invention will be more readily understood from the following description, taken in connection with the accompanying drawings forming part thereof in which.

Figure 3A:
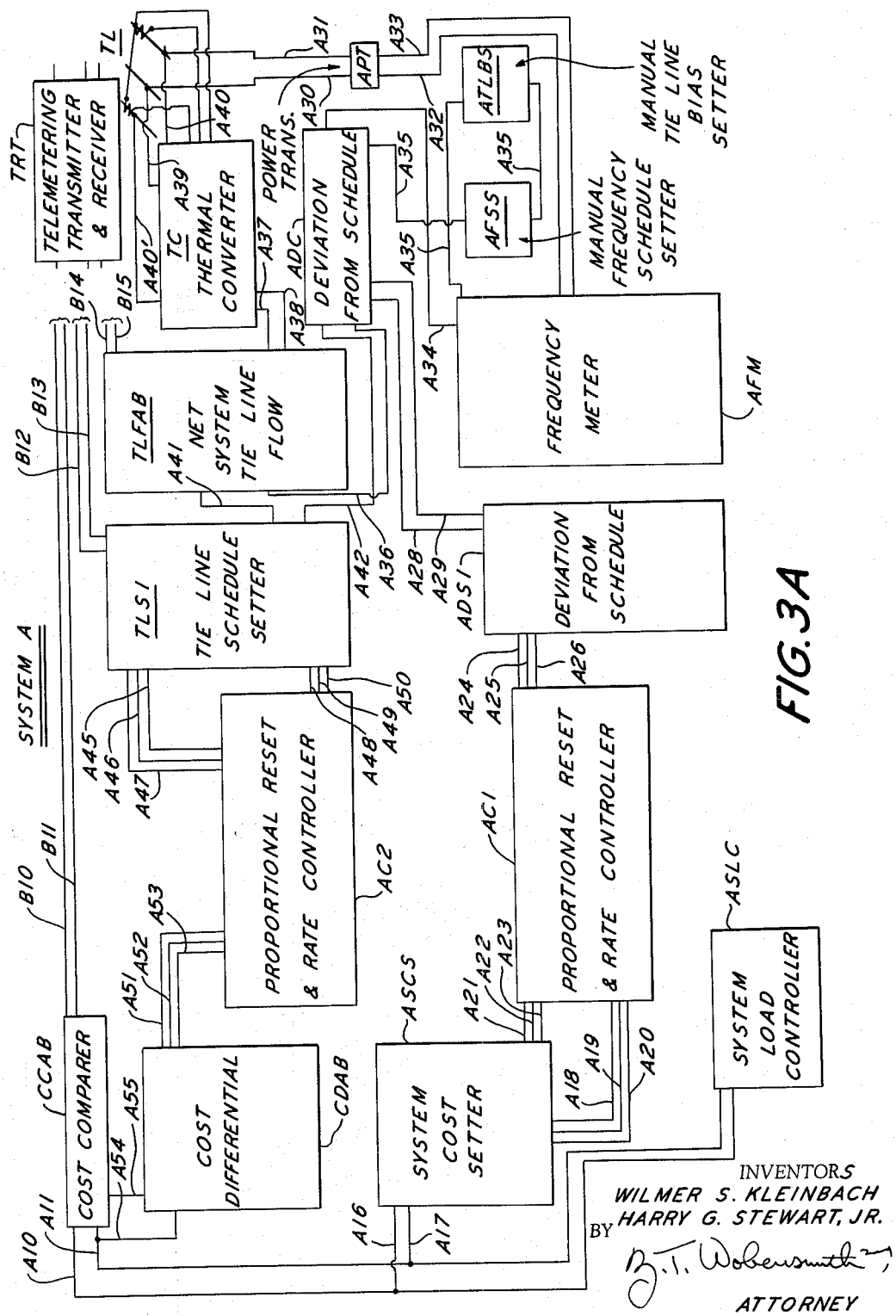
Figure 3B:
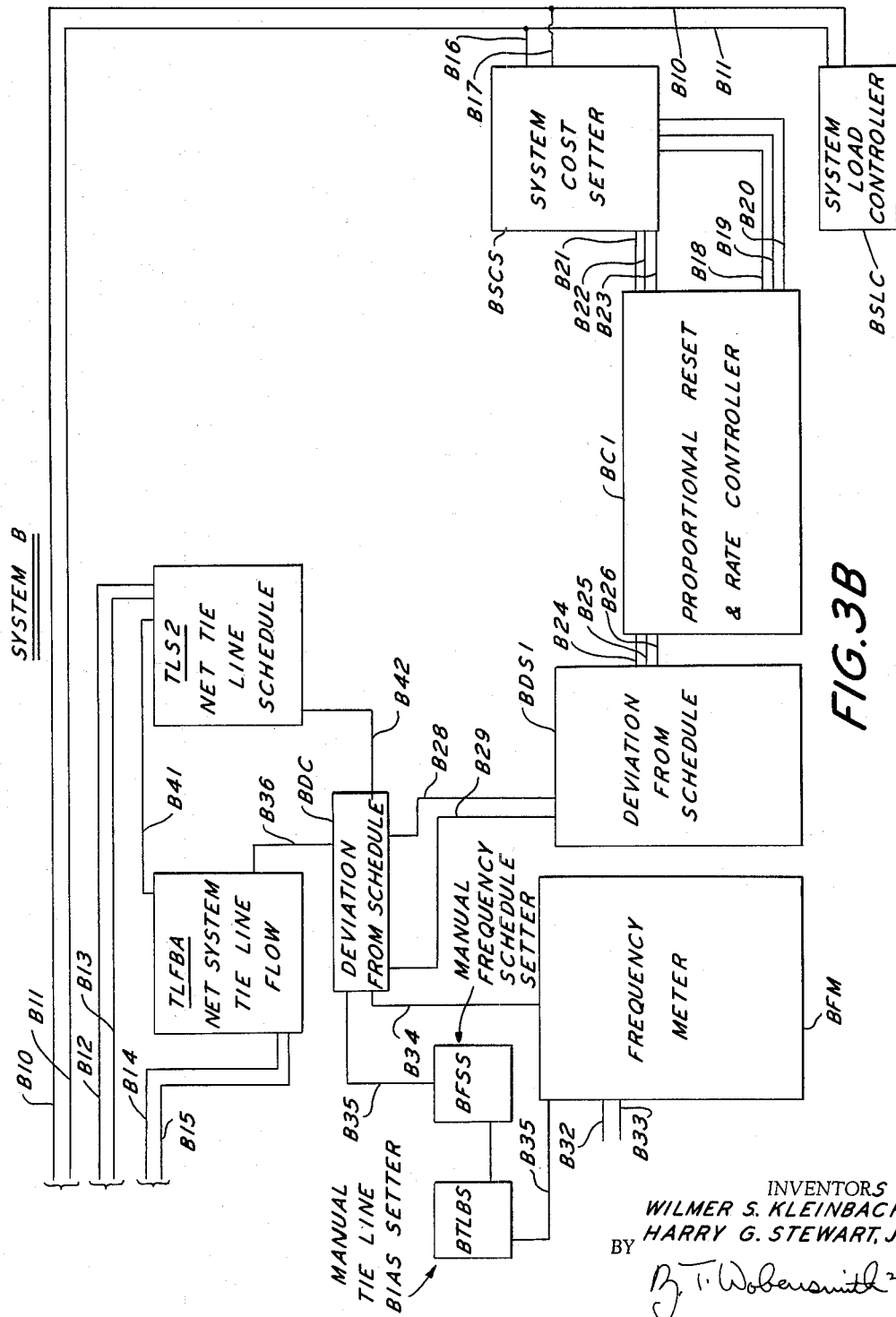
Figure 6A:
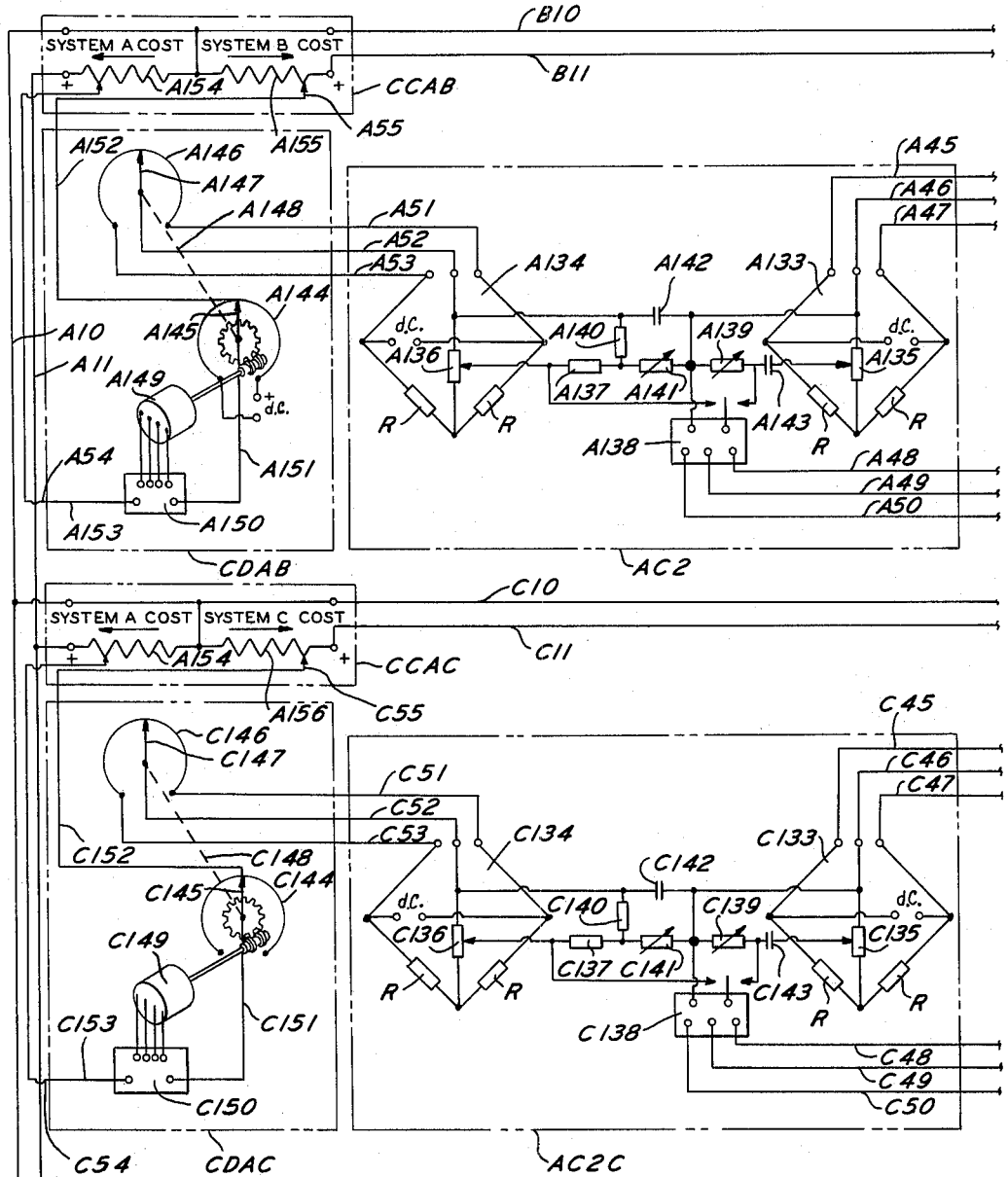
Figure 6B:
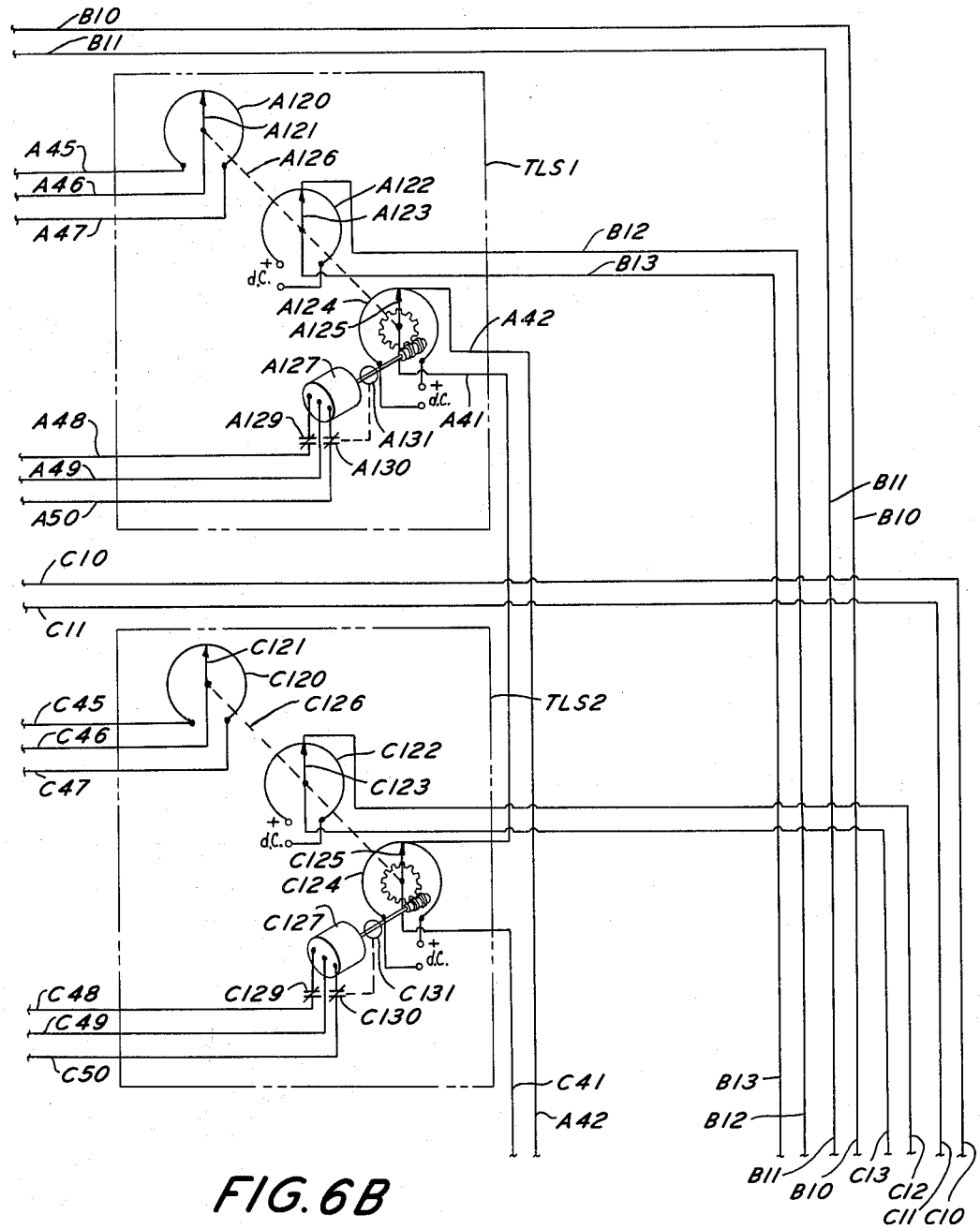
Figure 6C:
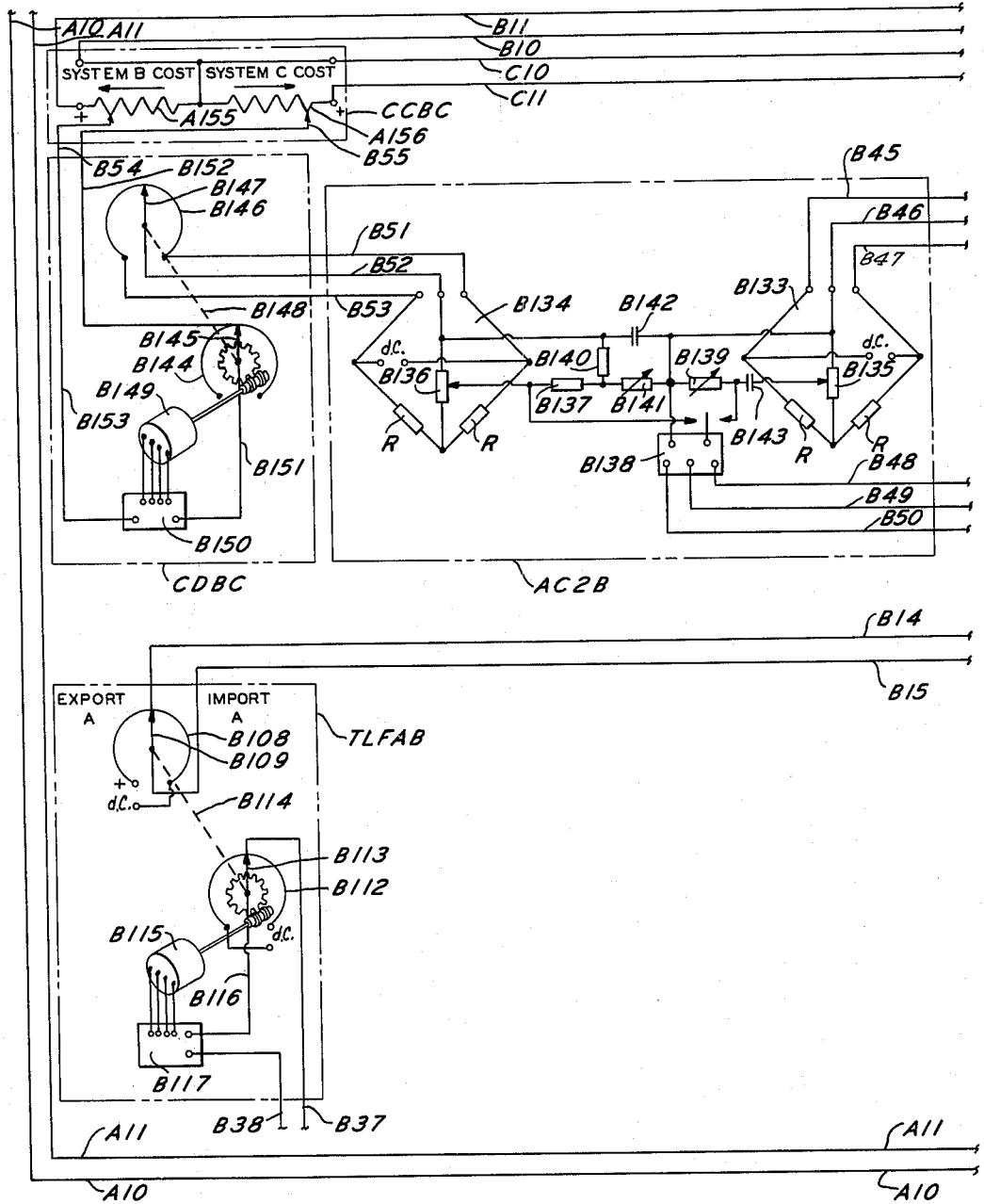
Figure 6D:
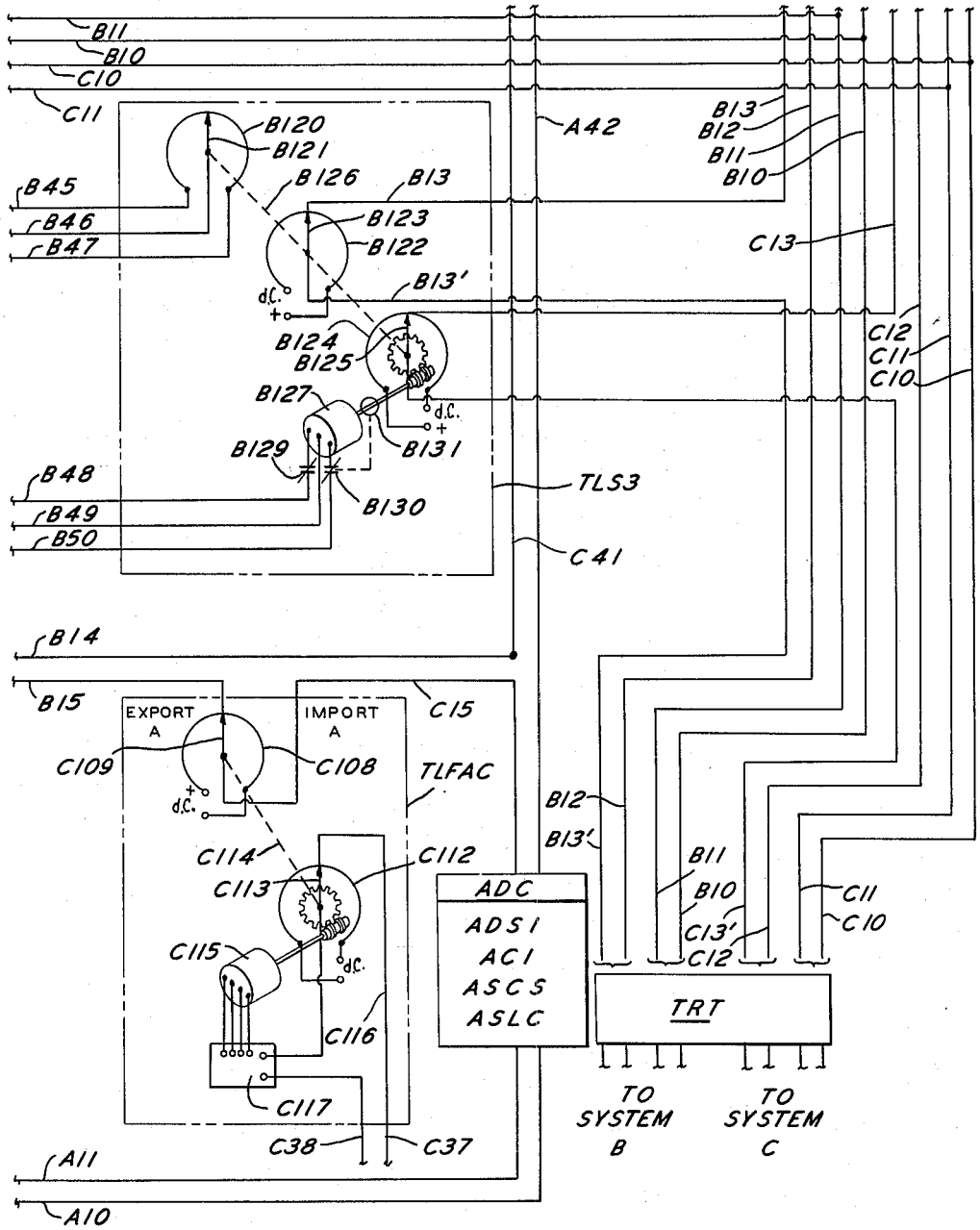

FIGS. 3A and 3B, taken together, are a diagrammatic view showing an arrangement for the parallel operation of two systems;

FIGS. 4A, 4B, 4C and 4D, when placed in sequence from left to right, show a complete circuit arrangement in accordance with the present invention for parallel operation of two systems;

FIG. 5 is a diagrammatic view showing an arrangement for the parallel operation of three systems; and FIGS. 6A, 6B, 6C and 6D, when placed with FIGS. 6A and 6B above and FIGS. 6C and 6D below, show a more detailed partial circuit arrangement for cost comparison and parallel operation of three systems.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1, 1A, 1B and 1C, of the drawings, an arrangement is illustrated diagrammatically showing three systems, designated respectively as system A, system B, and system C, connected and operating in parallel. For purposes of explanation, system A is assumed to have a load of 10,000 MW., a generation rate of 10,000 MW., an incremental cost of 3 mills; system B is assumed to have a load of 10,000 MW., a generation rate of 10,000 MW., and an incremental cost of 4 mills; and system C is assumed to have a load of 10,000 MW., a generation rate of 10,000 MW., and an incremental cost of 6 mills.

Figure 1:
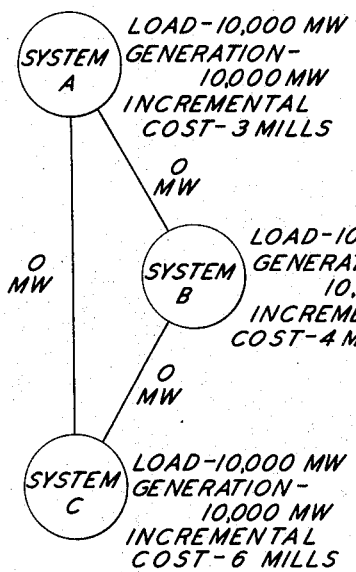
FIGURE 1 is a diagrammatic view showing a plurality of systems that are interconnected, but without any interchange of power.
Figure 1A:
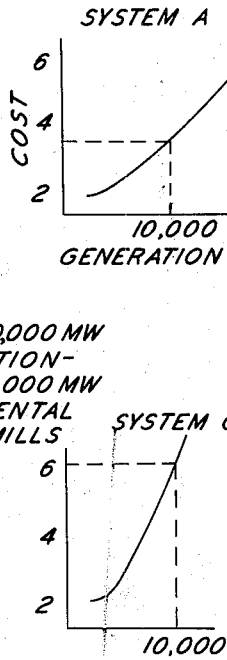
FIG. 1A shows the curve of incremental cost versus generation, and the cost for a specific load, on system A.
Figure 1B:
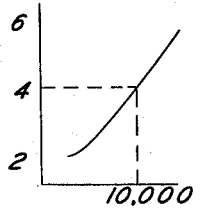
FIG. 1B shows the curve of incremental cost versus generation, and the cost for a specific load, on system B.
Figure 1C:
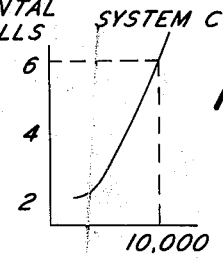
FIG. 1C shows the curve of incremental cost versus generation, and the cost for a specific load, on system C.

The cost curves of the three systems, i.e. system A, system B, and system C, are shown respectively in FIGS. 1A, 1B and 1C, in which the incremental costs in mills are plotted as ordinates while the generation rates in megawatts are plotted as abscissas.

Under the conditions shown in FIG. 1, no power is being interchanged between the three systems, A, B and C.

Figure 2:
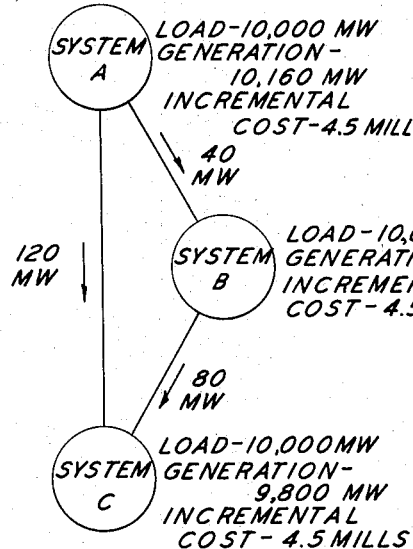
FIG. 2 is a diagrammatic view similar to FIG. 1, but showing interchange of power between the three systems, and distributed so as to be at a common incremental cost.
Figure 2A:
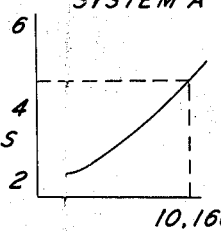
FIG. 2A shows the curve of incremental cost versus generation for system A and the cost for a specific load on that system and the power interchange of FIG. 2.
Figure 2B:
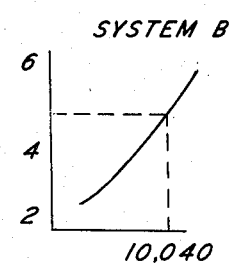
FIG. 2B shows the curve of incremental cost versus generation for system B and the cost for a specific load on that system and the power interchange of FIG. 2.
Figure 2C:
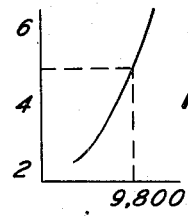
FIG. 2C shows the curve of incremental cost versus generation for system C and the cost for a specific load on that system and the power interchange of FIG. 2.

Referring now to FIG. 2, and also to FIGS. 2A, 2B and 2C, the same interconnection is shown, with the same loads on each of the systems, but with power interchange between the systems, adjusted for an optimum common incremental cost of generation of 4.5 mills. From the incremental cost plotting, system A will be called upon to generate 10,160 MW., system B will be called on to generate 10,040 MW., while the system C will be called on to generate 9800 MW. The respective generation distribution, of course, is based upon assumed incremental cost for the systems and results in all three systems operating at costs of 4.5 mills. Different incremental cost will result in a different distribution of generation as between the three systems.

In accordance with the invention, the incremental energy cost signals for each system are brought together over telemetering channels, and values, which may be voltages, representing the incremental energy costs of the systems are compared in cost comparer equipment whose output is a value, which may be a voltage, proportional to the difference in the incremental energy costs. This value or voltage is used to position an automatic tie line schedule setter which in turn actuates the conventional system load control equipment.

This system load control equipment develops a deviation from schedule signal affected by departures from scheduled frequency, which is employed in controlling generation on the individual systems. Changes in generation, in response to the deviation signal, change the incremental energy cost of the system. Such change in cost is returned to the cost comparer where the incremental energy costs of the systems are continuously compared.

Referring now more particularly to FIGS. 3A and 3B, the interconnection of two systems is shown with the cost comparer CCAB located, merely as a matter of convenience, at system A.

System A is shown on FIG. 3A, and system B is shown on FIG. 3B, with cost signal lines B10 and B11, net tie line schedule signal lines B12 and B13, and net tie line flow signal lines, lines B14 and B15, connected between the respective systems, through telemetering receivers and transmitters TRT.

System A is provided with automatic system load control equipment ASLC, of known type, for its generating units, to which the cost signal lines A10 and A11 are connected, these lines also being connected by conductors A16 and A17 to a system cost setter ASCS, which has a controller AC1 connected thereto by conductors A18, A19, A20, A21, A22 and A23. The controller AC1 preferably has proportional, reset and rate action, and in turn has connected thereto by conductors A24, A25 and A26, an instrument ADS1, which can be a recorder, which is responsive to deviation from schedule, and which is in turn connected by conductors A28 and A29 to a schedule deviation comparer ADC.

The intersystem transmission lines TL between the respective systems have connected thereto, by conductors A30 and A31 to one phase thereof, a power transformer APT which is connected by conductors A32 and A33 to a frequency meter AFM.

The frequency meter AFM is connected to the deviation comparer ADC by a conductor A34 and by a conductor A35 having in series therewith a manually adjustable tie line bias setter ATLBS and a manually adjustable frequency schedule setter AFSS.

The deviation comparer ADC has a conductor A36 extending to a net system tie line flow recorder TLFAB. The net tie line flow recorder TLFAB has connected thereto, by conductors A37 and A38, a polyphase thermal converter TC which is connected by conductors A39, A40 and A40′ to the intersystem transmission lines TL.

The recorder TLFAB is connected by conductor A41 to a tie line schedule setter TLS1. The recorder TLFAB has the tie line flow signal lines B14 and B15 connected thereto.

The tie line schedule setter TLS1 has the tie line schedule signal lines B12 and B13 extending thereto and has conductors A45, A46, A47, A48, A49 and A50, connected to a controller AC2, which preferably has proportional, reset and rate actions. The controller AC2 is connected by conductors A51, A52, and A53 to a cost differential recorder CDAB which in turn is connected to a cost comparer CCAB by conductors A54 and A55.

The cost comparer CCAB has the cost signal lines B10 and B11 extending thereto from system B.

System B is also provided with automatic system load control equipment BSLC, of known type, for its generating units, to which the cost signal lines B10 and B11 are connected, these lines also being connected by conductors B16 and B17 to a system cost setter BSCS which has a controller BC1 connected thereto by conductors B18, B19, B20, B21, B22 and B23. The controller BC1 preferably has proportional, reset and rate action, and in turn has connected thereto by conductors B24, B25 and B26, an instrument BDS1 which is responsive to deviation from schedule and which is in turn connected by conductors B28 and B29 to a schedule deviation comparer BDC.

The intersystem transmission lines TL, as before, are connected through a power transformer (not shown) by conductors B32 and B33 to a frequency meter BFM.

The frequency meter BFM is connected by conductors B34 and B35 through a manually adjustable tie line bias setter BTLBS and a manually adjustable frequency schedule setter BFSS to the deviation comparer BDC.

The deviation comparer BDC has a conductor B36 extending to a net tie line flow recorder TLFBA. The recorder TLFBA has the system tie line flow signal lines B14 and B15 connected thereto.

The recorder TLFBA is connected by a conductor B41 to the net tie line schedule setter TLS2, to which the tie line schedule signal lines B12 and B13 are connected, and a conductor B42 is connected to the schedule deviation comparer BDC.

Figure 4A:
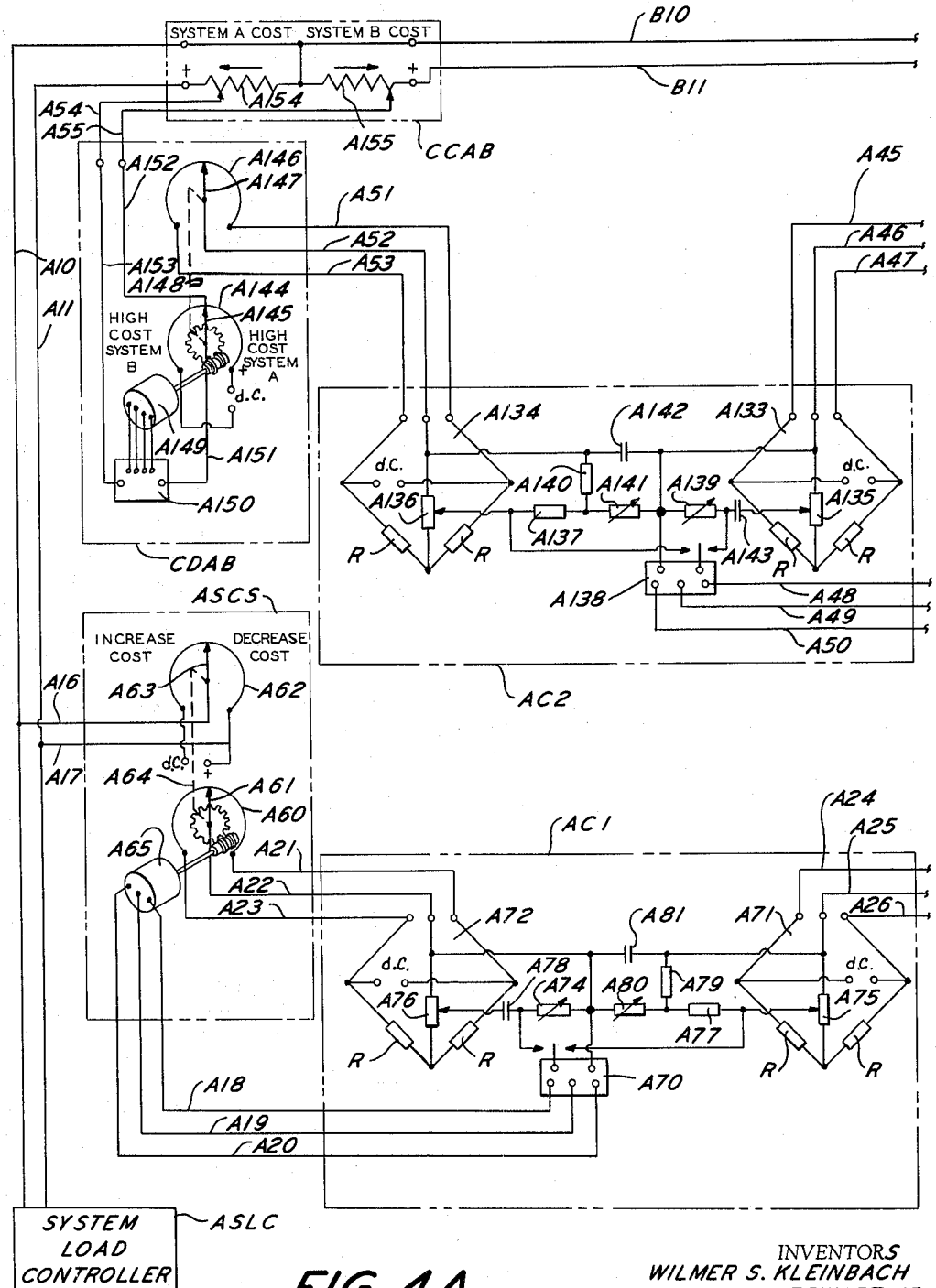
Figure 4B:
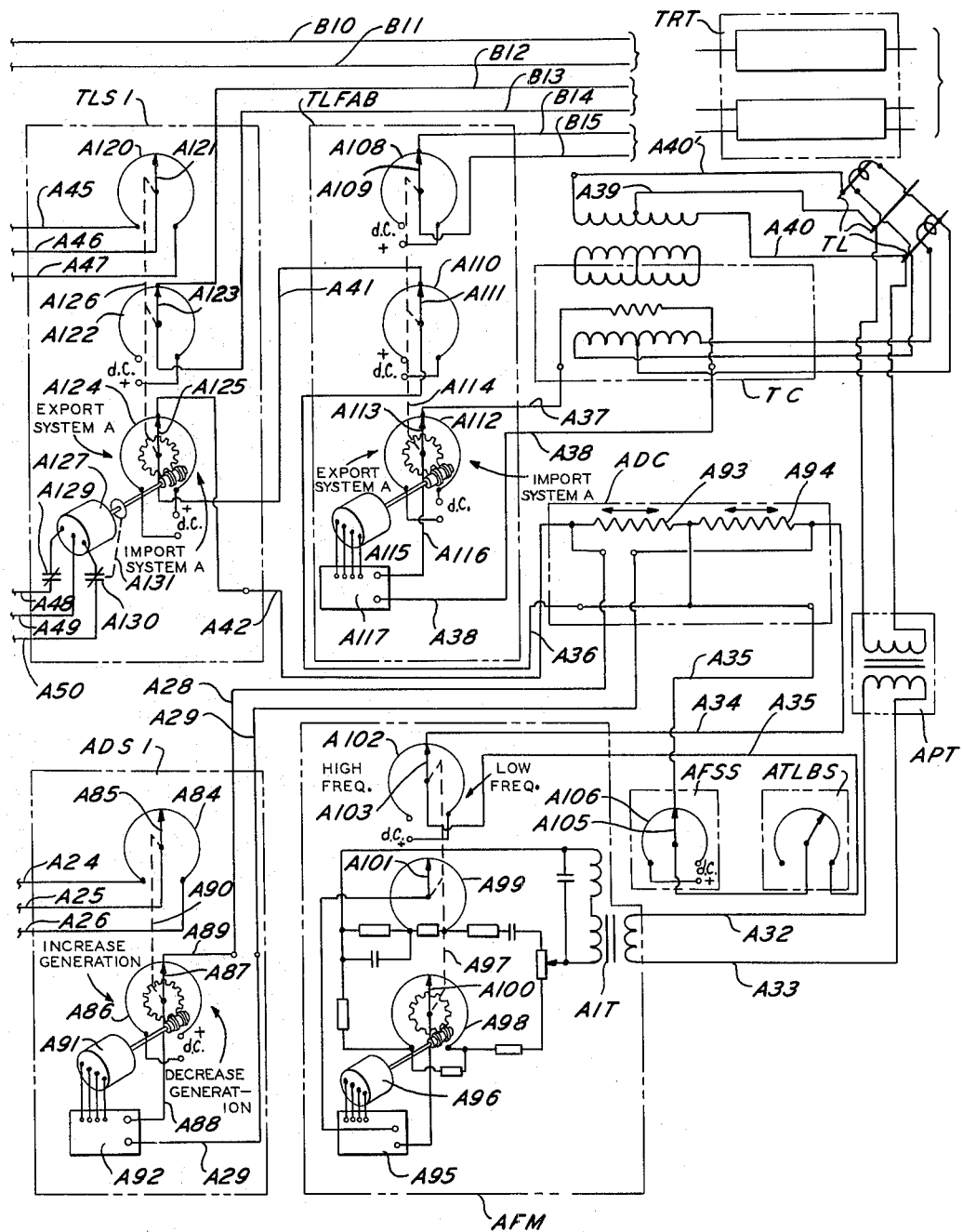
Figure 4C:
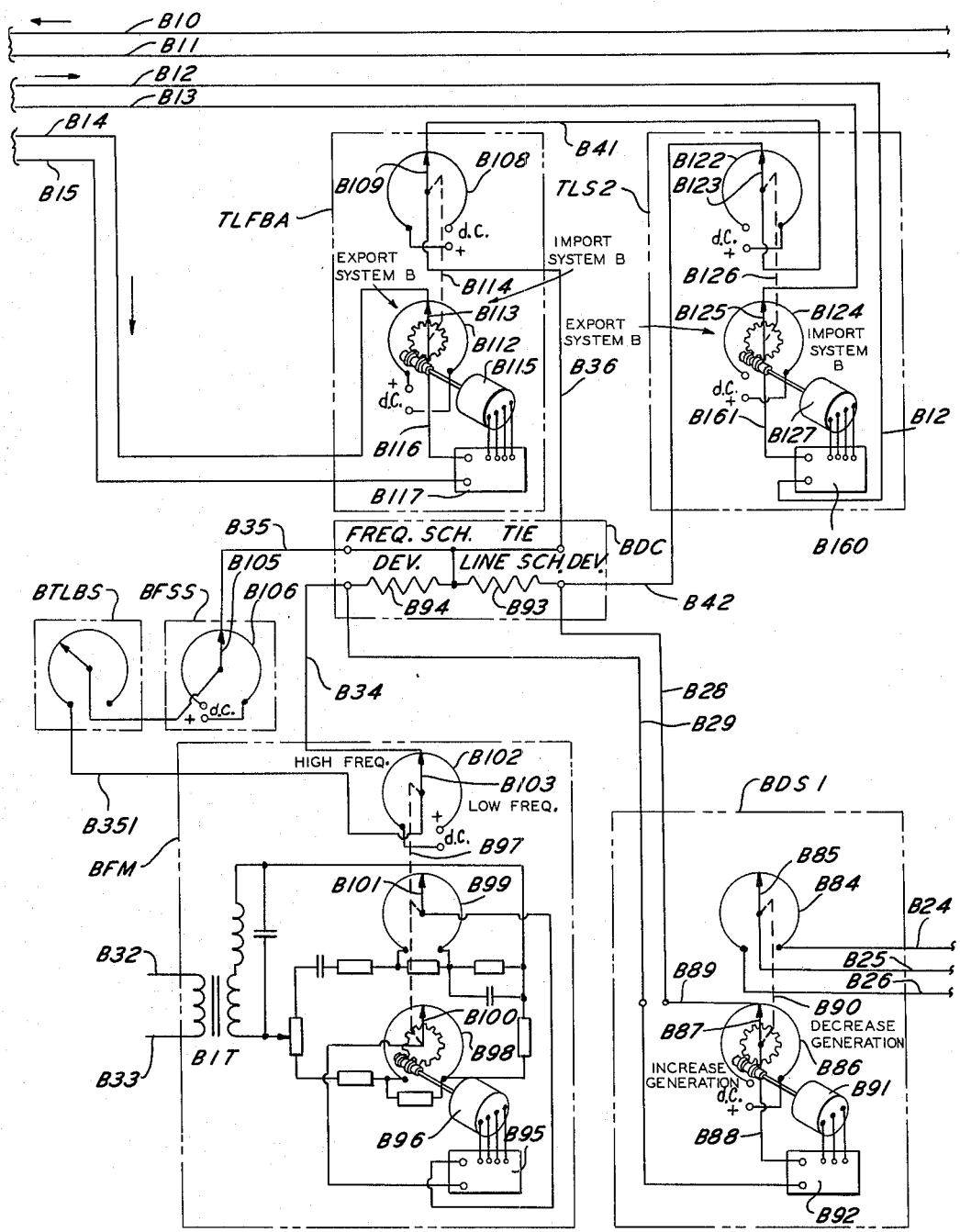
Figure 4D:
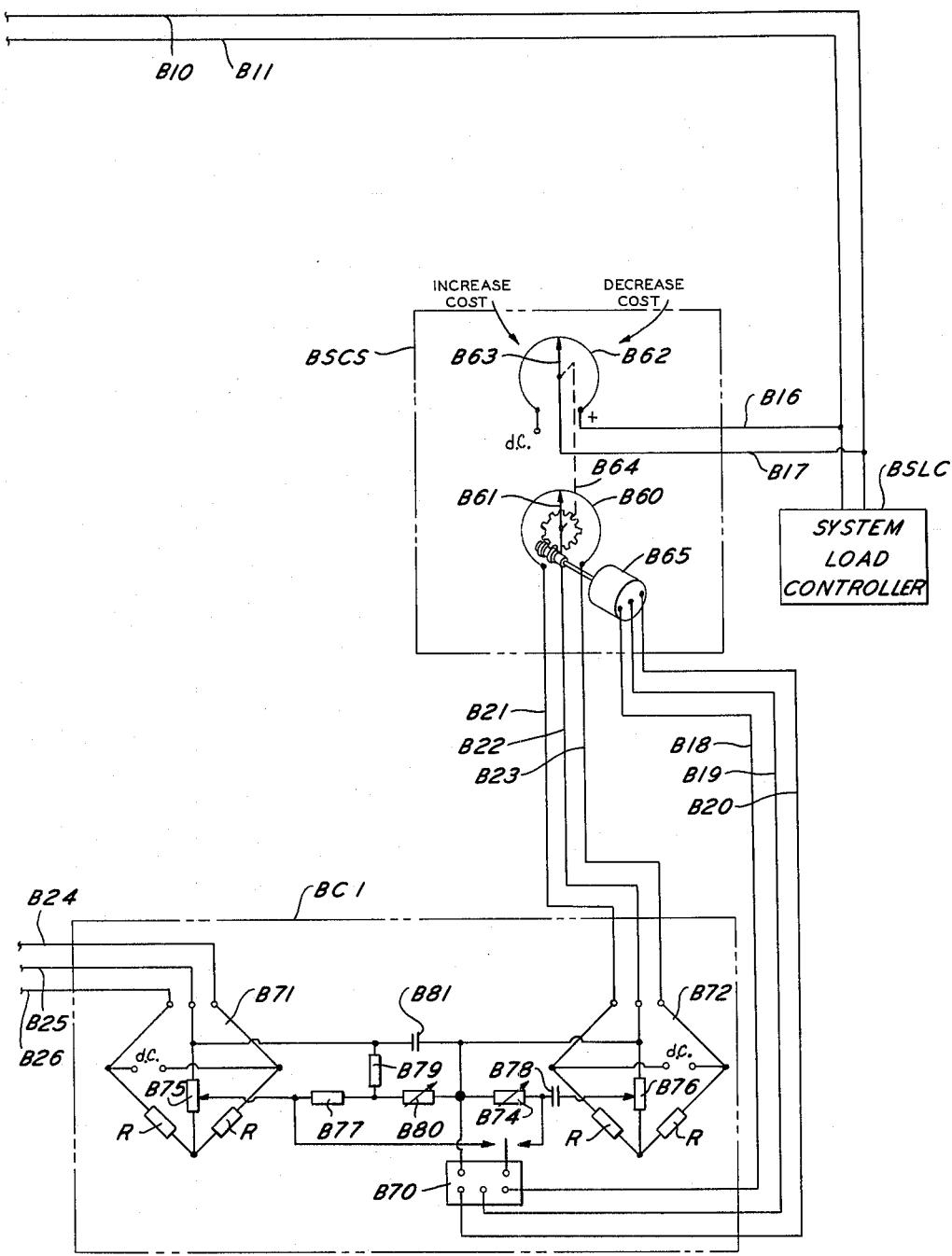

Referring now more particularly to FIGS. 4A, 4B, 4C and 4D, specific and detailed circuits are there illustrated with system A on FIGS. 4A and 4B and system B on FIGS. 4C and 4D, and with the telemetering receiver and transmitter TRT interposed on FIG. 4A in the signal lines between the systems.

Referring first to system A on FIGS. 4A and 4B, the system cost setter ASCS, in a specific embodiment, preferably includes a null-balance instrument of known type, having a balancing slide wire A60 with its movable contact A61, a system A cost retransmitting slide wire A62 with its movable contact A63, a shaft A64 simultaneously driving the contacts A61 and A63, and a balancing motor A65 driving the shaft A64. The slide wire A62 can have a D.C. source connected to its ends, with a polarity as indicated, and the conductor A17 connected to one end and to the positive side of the source. The contact A63 has the conductor A16 connected thereto.

Increase of cost can be considered as corresponding to counterclockwise movement and decrease of cost can be considered as corresponding to clockwise movement of the contacts A61 and A63. The balancing motor A65 has the conductors A18, A19 and A20 connected thereto. The balancing slide wire A60 has the conductors A21 and A23 connected to its opposite ends and the contact A61 has the conductor A22 connected thereto.

The conductors A18, A19 and A20 are connected to a detector-amplifier A70 forming part of the controller AC1.

The controller AC1 can be of known type, preferably with proportional, reset and rate action. The controller AC1, as shown, has a control bridge A71 and a feedback bridge A72.

The feedback bridge A72 has the conductors A21 and A23 connected to two of its arms, has the conductor A22 connected thereacross, has a direct current source with a selected polarity disposition determined by the requirements of other equipment, has predetermined resistances R, and has proportional band rheostats A75 and A76 which permit adjustment of proportional action. Any unbalanced signal across the resistance A77 connected between the contacts of the rheostats A75 and A76, which is detected by the detector-amplifier A70 is effective therefrom as an input through conductors A18, A19, A20, at the motor A65, depending upon the direction of unbalance. Reset action is supplied by the introduction of the capacitor A78 and adjustable resistor A74, and rate action is supplied by the fixed and variable resistors A79 and A80 and the capacitor A81 in the bridge circuit.

The control bridge A71 has two of its arms connected to a deviation from schedule retransmitting slide wire A84, forming part of the deviation from schedule recorder ADS1, by the conductors A24 and A26, the center of the bridge A71 being connected to the movable contact A85 by the conductor A25.

The deviation from schedule recorder ADS1, in a specific embodiment, preferably includes a null-balance instrument of known type, having a deviation from schedule control slide wire A86 with its movable contact A87, and the deviation from schedule retransmitting slide wire A84 with its movable contact A85, a shaft A90 simultaneously driving the contacts A85 and A87, and a balancing motor A91 driving the shaft A90. The slide wire A86 can have a D.C. source connected to its ends, with a polarity as indicated. A detector-amplifier A92 is connected to the motor A91 for driving the same. Increase of generation is indicated as involving counterclockwise movement with decrease as clockwise movement.

The detector-amplifier A92 is connected by a conductor A88 to the contact A87. The midpoint of the slide wire A86 is connected by a conductor A89 to the conductor A28 which leads to the deviation from schedule comparer ADC. The detector-amplifier A92 is also connected by the conductor A29 to the comparer ADC.

The deviation from schedule comparer ADC may be of any desired type but preferably comprises matching resistors A93 and A94 connected in series. The voltage drop across resistor A93 is affected by deviation from tie line schedule, and the voltage drop across resistor A94 is affected by deviation from frequency schedule.

The frequency meter AFM can be of any desired type, and is preferably of the null-balance measuring type in which balance is accomplished through the use of an electronic amplifier. It can advantageously include a Wien impedance bridge circuit. As shown, the meter AFM which is connected for input through the conductors A32 and A33 to the power transformer APT and through an internal input transformer AIT, can be employed to control the detector-amplifier A95 to operate the balancing motor A96 to position the shaft A97, with the slide wires A98 and A99 and their movable contacts A100 and A101 effective for frequency input action and with a retransmitting slide wire A102 connected to a D.C. source with a polarity as indicated. High frequency is indicated by counterclockwise movement of the shaft A97 from a position corresponding to the mid-position of the contact A103 on the slide wire A102 and low frequency is indicated by clockwise movement from the same position.

The midpoint of the slide wire A102 is connected by the conductor A34 to the same terminal of the resistor A94 as the conductor A29. The movable contact A103 is connected by the conductor A35 through the manually adjustable tie line bias setter ATLBS, which advantageously is a variable resistor, and to the movable contact A105 of a manually adjustable frequency schedule setter AFSS which engages a slidewire A106 connected to a D.C. source with a polarity as indicated. The mid-point of the resistor A106 is connected by the conductor A35 to the central connection of the resistances A93 and A94. The adjustment of the contact A105 on the resistor A106 modifies the signal from the ferquency meter AFM by algebraic addition of a voltage as desired.

The net system tie line flow recorder TLFAB, in a specific embodiment, can advantageously be a null-balance measuring instrument with a system B net tie line flow retransmitting slide wire A108 with its movable contact A109, a system A net tie line flow slide wire A110 with its movable contact A111, a tie line flow control slide wire A112 with its movable contact A113, a shaft A114 simultaneously driving the contacts A109, A111 and A113, and a balancing motor A115 driving the shaft A114.

The slide wire A108 can have a D.C. source connected to its ends with a polarity as indicated, and its midpoint connected to the tie line flow signal line B14. The movable contact A109 is connected to the tie line flow signal line B15.

The slide wire A110 can have a D.C. source connected to its ends, with a polarity as indicated, and the midpoint of the slide wire is connected by the conductor A41 to the tie line schedule setter TLS1. The movable contact A111 is connected by the conductor A36 to the central connection of the resistors A93 and A94 of the deviation from schedule comparer ADC.

The slide wire A112 can have a D.C. source connected to its ends with a selected polarity disposition determined by the requirements of other equipment. The movable contact A113 is connected at one end by a conductor A116 to a detector-amplifier A117 which drives the motor A115. The midpoint of the slide wire A112 is connected by the conductor A37 to the thermal convertor TC. The detector-amplifier A117 is connected by conductor A38 to the thermal convertor TC. Export of power from system A is indicated by counterclockwise movement of the shaft A114 from a position corresponding to the midposition of the contact A113 on the slide wire A112 and import of power to system A by clockwise movement of the shaft A114 from the same position.

The polyphase thermal convertor TC can be of any preferred type of device for generating a D.C. millivoltage proportional to A.C. power in the metered circuit, and is connected by conductors A39, A40 and A40' to the intersystem transmission lines TL. The generated voltage is effective through the conductors A37 and A38 to the net system tie line flow recorder TLFAB.

The tie line schedule setter TLS1, in a specific embodiment, preferably includes a null-balance instrument of known type, having a balancing slide wire A120 with its movable contact A121, a system B tie line schedule retransmitting slide wire A122 with its movable contact A123, a system A tie line schedule slide wire A124 with its movable contact A125, a shaft A126 simultaneously driving the contacts A121, A123 and A125, and a balancing motor A127 driving the shaft A126.

The balancing slide wire A120 has its opposite ends connected to the conductors A45 and A47 and its contact A121 connected to the conductor A46.

The system B tie line schedule retransmitting slide wire A122 has a D.C. source, with a polarity as indicated, connected to the opposite ends thereof and the midpoint of the slide wire A 122 is connected to the tie line schedule signal line B12. The contact A123 is connected to the tie line schedule signal line B13.

The system A tie line schedule slide wire A124 has a D.C. source connected to its opposite ends with a polarity as indicated, and the contact A125 is connected by the conductor A41 to the midpoint of slide wire A110. The midpoint of the slide wire A124 is connected to the conductor A42 leading to the outer end connection of the resistor A93.

The balancing motor A127 is operated by the detector-amplifier A138 forming part of the controller AC2, the conductors A48, A49 and A50 extending thereto.

Counterclockwise movement of the shaft A126 from a position corresponding to the midposition of the contact A125 on the slidewire A124 corresponds to increase of export of power from the system A while clockwise movement of the shaft A126 from the same position corresponds to increase of import of power to system A.

An export limit switch A129 in the conductor A48 and an import limit switch A130 in the conductor A50 and operated at selected angular positions of the shaft A126 by a limit switch operator A131 limits the export from and import to system A.

The controller AC2, in a specific embodiment, can be of well known type, is preferably similar to the controller AC1, and preferably has proportional, reset and rate action. The controller AC2, as shown, has a feedback bridge A133 and a control bridge A134. The feedback bridge A133 has the conductors A45 and A47 connected to two of its arms and the conductor A46 connected thereto. Each bridge A133 and A134 has a D.C. source with a selected polarity disposition determined by the requirements of the equipment, has predetermined resistances R, and has proportional band rheostats A135 and A136 which permit adjustment of proportional action. Any unbalanced signal across the resistance A137 connected between the contacts of the rheostats A135 and A136, detected by the detector-amplifier A138 is effective therefrom as an input through the conductors A48, A49 and A50, at the motor A127, depending upon the direction of unbalance. Reset action is supplied by the introduction of the capacitor A143 and its adjustable resistor A139, and rate action is supplied by the resistors A140 and A141 and the capacitor A142 in the bridge circuit.

The control bridge A134 has the conductors A51 and A53 connected to two of its arms and the conductor A52 connected across.

The cost differential recorder CDAB, in a specific embodiment, preferably includes a null-balance instrument of known type, having balancing cost control slide wire A144 with its movable contact A145, a cost retransmitting slide wire A146 with its movable contact A147, a shaft A148 simultaneously driving the contacts A145 and A147, and a balancing motor A149 driving the shaft A148. The slide wire A146 is connected by the conductors A51 and A53 to legs of the control bridge A134 and the contact A147 is connected by the conductor A52 across the bridge A134. A detector-amplifier A150 is provided for driving the motor A149 and is connected by a conductor A151 to the contact A145. The midpoint of the slide wire A144 is connected by a conductor A152 to the conductor A55 and thence to the cost comparer CCAB.

The detector-amplifier A150 is also connected by a conductor A153 to the conductor A54 and thence to the cost comparer CCAB at which the incremental energy costs of the systems A and B are compared. Counterclockwise movement of the shaft A148 from a position corresponding to the midposition of the contact A145 on the slidewire A144 corresponds to high cost of system B and clockwise movement of the shaft A148 from the same position corresponds to high cost of system A.

The system load controller ASLC, which can be of well known type for distributing the load between the various generating units of the system A, is connected by conductors A10 and A11 to the cost comparer CCAB, with conductors A16 and A17 connected to the system cost setter ASCS.

The cost comparer CCAB in a preferred embodiment, has resistances A154 and A155 for systems A and B connected in series.

The conductor A11 is connected to the outer end of the system A cost resistance A154, and the conductor A54 is adjustably connected to the cost resistance A154. The conductor B11 is connected to the outer end of the system B cost resistance A155, and the conductor A55 is adjustably connected to the system B cost resistance A155. Conductors A10 and B10 are connected together to the point of connection of the resistances A154 and A155. The cost comparer CCAB thus provides for comparison of the incremental energy cost of each of the systems A and B on a one to one ratio or other ratio as desired.

Referring now to system B, shown on FIGS. 4C and 4D, the system cost setter BSCS in a specific embodiment, preferably includes a null-balance instrument of known type, having a balancing slide wire B60 with its movable contact B61, a system B cost retransmitting slide wire B62 with its movable contact B63, a shaft B64 simultaneously driving the contacts B61 and B63, and a balancing motor B65 driving the shaft B64. The slide wire B62 can have a D.C. source connected to its ends with a polarity as indicated, and the conductor B16 connected to one end and to the positive side of the source and thence to the conductor B11. The contact B63 has the conductor B17 connected thereto and thence to the conductor B10.

The system load controller BSLC, which can be of well known type for distributing the load between the various generating units of the system B, is connected by conductors B10 and B11 to the cost comparer CCAB with conductors B16 and B17 connected to the system cost setter BSCS.

Increase of cost can be considered as corresponding to counterclockwise movement and decrease of cost can be considered as corresponding to clockwise movement of the contacts B61 and B63. The balancing motor B65 has the conductors B18, B19, and B20 connected thereto. The balancing slide wire B60 has the conductors B21 and B23 connected to its opposite ends and the contact B61 has the conductor B22 connected thereto.

The conductors B18, B19, and B20 are connected to a detector-amplifier B70 forming part of the controller BC1. The controller BC1 can be of known type preferably with proportional, reset and rate action. The controller BC1, as shown has a control bridge B71 and a feedback bridge B72. The feedback bridge B72 has the conductors B21 and B23 connected to two of its arms, has the conductor B22 connected thereacross, has a direct current source with a selected polarity disposition determined by the requirements of the equipment, has predetermined resistances R, and has proportional band rheostats B75 and B76 which permit adjustment of proportional action. Any unbalanced signal across the resistance B77, connected between the contacts of the rheostats B75 and B76, which is detected by the detector-amplifier B70 is effective therefrom as an input through conductors B18, B19, B20, at the motor B65, depending upon the direction of unbalance. Reset action is supplied by the introduction of the capacitor B78 with adjustable resistor B74 and rate action is supplied by the fixed and variable resistors B79 and B80 and the capacitor B81 in the bridge circuit.

The control bridge B71 has two of its arms connected to a deviation from schedule retransmitting slide wire B84 forming part of the deviation from schedule recorder BDS1, by the conductors B24 and B26, the center of the bridge B71 being connected to the movable contact B85 by the conductor B25.

The deviation from schedule recorder BDS1, in a specific embodiment, preferably includes a null-balance instrument of known type, having a deviation from schedule control slide wire B86 with its movable contact B87, and a deviation from schedule retransmitting slide wire B84 with its movable contact B85, a shaft B90 simultaneously driving the contacts B85 and B87, and a balancing motor B91 driving the shaft B90. The slide wire B86 can have a D.C. source connected to its ends with a polarity as indicated and its midpoint connected to the conductor B89, which is connected to the conductor B28. The detector-amplifier B92 is connected by a conductor B88 to the contact B87 and the detector-amplifier B92 is connected to the motor B91 for driving the same. The detector-amplifier B92 is also connected by the conductor B29 to the comparer BDC.

Increase of generation is indicated as involving counterclockwise movement of the shaft B90 with decrease as clockwise movement.

The deviation from schedule comparer BDC may be of any desired type, and in a preferred embodiment of the invention comprises matching resistors B93 and B94 connected in series. The resistor B93 is affected by deviation from tie line schedule, and the resistor B94 is affected by deviation from frequency schedule.

The frequency meter BFM can also be of any desired type, and is preferably of the null-balance measuring type in which balance is accomplished through the use of an electronic amplifier. It can advantageously include a Wien impedance bridge circuit. As shown, the frequency meter has the conductors B32 and B33 connected thereto for input through an internal input transformer BIT from a power transformer (not shown) connected in a manner similar to the transformer APT to the intersystem transmission lines TL. The frequency meter BFM can be employed to control the detector-amplifier B95 to operate the balancing motor B96 to position the shaft B97, with the slide wires B98 and B99 and their movable contacts B100 and B101 effective for frequency input action and with a retransmitting slide wire B102 connected to a D.C. source with a polarity as indicated. High frequency is indicated by counterclockwise movement of the shaft B97 from a position corresponding to the midposition of the contact B103 on the slide wire B102 and low frequency is indicated by clockwise movement from the same position.

The slide wire B102 has its midpoint connected by the conductor B34 to one end of the resistor B94. The movable contact B103 is connected by the conductor B351 through the manually adjustable tie line bias setter BTLBS, which is advantageously a variable resistor, and to the movable contact B105 of a manually adjustable frequency schedule setter BFSS which preferably has a resistor B106 connected to a D.C. source having a polarity as indicated. The midpoint of the resistor B106 is connected by the conductor B35 to the central connection of the resistors B93 and B94. The adjustment of the movable contact B105 on resistor B106 modifies the signal from the frequency meter BFM by algebraic addition of a voltage as desired.

The net system tie line flow recorder TLFBA, in a specific embodiment, can advantageously be a null-balance measuring instrument with a system B net tie line flow retransmitting slide wire B108 with its movable contact B109, a tie line flow control slide wire B112 with its movable contact B113, a shaft B114 simultaneously driving the movable contacts B109 and B113, and a balancing motor B115 driving the shaft B114.

The slide wire B108 can have a D.C. source with polarity as indicated, connected to its ends and its midpoint connected by the conductor B41 to the tie line schedule setter TLS2. The movable contact B109 is connected by the conductor B36 to the central connection of the resistors B93 and B94 to which the conductor B35 is also connected.

The slide wire B112 can have a D.C. source with polarity as indicated connected to its ends. The movable contact B113 is connected by a conductor B116 to a detector-amplifier B117 which drives the motor B115. The midpoint of the slide wire B112 has the conductor B14 connected thereto. The other contact of the amplifier B117 is connected to the conductor B15.

The net tie line schedule setter TLS2, in a specific embodiment, preferably includes a null-balance instrument of known type, having a system B tie line schedule retransmitting slide wire B122 with its movable contact B123, and a system B tie line schedule slide wire B124 with its movable contact B125, a shaft B126 simultaneously driving the contacts B123 and B125, and a balancing motor B127 driving the shaft B126. The balancing motor B127 is in turn operated by a detector-amplifier B160.

The slide wire B122 has a D.C. source with a polarity as indicated connected thereto and has its midpoint connected by the conductor B42 to one end of the resistor B93. The movable contact B123 is connected to the conductor B41.

The slide wire B124 has a D.C. source with a polarity as indicated connected thereto and its movable contact B125 is connected by conductor B161 to one terminal of detector-amplifier B160. The midpoint of the slide wire B124 is connected to the signal line B13. The other terminal of the detector-amplifier B160 has the signal line B12 connected thereto.

The mode of operation will now be pointed out.

Assume first that system A and system B are in operation and in an equilibrium condition at a predetermined common incremental cost level.

A signal voltage from the system cost setters ASCS and BSCS is available to the cost comparer CCAB and to the system load controllers ASLC and BSLC through the cost signal lines A10, A11 and B10, B11.

Since it is assumed initially that an equilibrium condition exists, the cost differential instrument CDAB is likewise in equilibrium so that it does not act through the controller AC2.

The tie line schedule setters TLS1 and TLS2 remain in their previously set condition and the net system tie line flow recorders TLFAB and TLFBA do not change their condition.

If, now, a change occurs in the load or generation conditions in one of the systems so that its incremental cost has changed (cf. FIGS. 1A, 1B, 1C, 2A, 2B, 2C), this change can be reflected in various ways.

Assuming that such a change has occurred at either of the system load controllers ASLC or BSLC, the change is fed to the resistances A154 or A155 of the cost comparer CCAB and provides an output to the cost differential instrument CDAB, which is proportional to the difference in the incremental energy costs. The cost differential instrument CDAB, through the controller AC2, modifies the position of the tie line schedule setter TLS1 which in turn sends a signal through the signal lines B12 and B13 to the tie line schedule setter TLS2 calling for an appropriate modification of the setting of the tie line schedule setter TLS2.

Respective signals resulting from this modified position of tie line schedule setters TLS1 and TLS2 are then added algebraically with the actual net tie line flow signal, as sensed by the respective net system tie line flow instruments TLFAB and TLFBA, and resultant signal is passed on to the respective deviation from schedule instruments ADC and BDC.

In the ADC and BDC instruments any deviation from scheduled frequency is combined with the deviation from tie line schedule and the composite signal is passed on to the respective deviation from schedule instruments ADS1 and BDS1.

The reaction of the respective deviation from schedule instruments ADS1 and BDS1 to this signal modifies the system cost setters ASCS and BSCS, respectively, with proportional, reset and rate control being provided by controllers AC1 and BC1, respectively. This resultant cost signal sent to the systems will be such as to return the systems to equal incremental cost, at newly established tie line schedules, within the limits of tie line flows.

The provisions in the equipment described for adjustment, including the manual frequency schedule setters AFSS and BFSS, the manual tie line bias setters ATLBS and BTLBS permit of accommodation to conditions encountered in actual operation.

The use of null-balance instruments, and the incorporation of proportional, reset and rate actions provide for the use of known control instrumentation so that there is freedom from unexpected control deviations with an assurance of reliability of action.

Referring now more particularly to FIG. 5 of the drawings, the interconnection of a plurality and more than two systems, and specifically three systems, A, B and C, is shown with cost comparer CCAB, for comparing incremental energy costs of systems A and B, cost comparer CCAC for comparing incremental energy costs of systems A and C and cost comparer CCBC for comparing incremental energy costs of systems B and C. The cost comparers CCAB, CCAC and CCBC can be and preferably are located, merely as a matter of convenience, at system A.

The system equipment for each of the separate systems is similar to that previously described with respect to FIGS. 4A, 4B, 4C and 4D, for the systems A and B.

For each system, in addition to the cost comparers, there is provided tie line schedule setters TLS1, TLS2 and TLS3.

For each pair of systems, also, cost differential units are provided, shown as CDAB, CDAC and CDBC. Each of the cost differential units CDAB, CDAC and CDBC is provided with a controller, illustrated as controllers AC2, AC2C and AC2B. Each of the controllers is preferably provided, as before, with proportional, reset and rate action.

Net tie line flow meters and associated equipment is provided for measuring the net tie line flow between the respective systems and providing appropriate signals, and this can include meters TLFAB and TLFAC for system A, meters TLFCA and TLFCB for system C and meters TLFBA and TLFBC for system B, together with deviation from schedule comparers ADC, CDC and BDC.

Signal lines are also provided as previously mentioned.

Cost signal lines A10 and A11 for system A, cost signal lines B10 and B11 for system B, and cost signal lines C10 and C11 are provided for system C, as before.

Net tie line schedule signal lines B12, B13 and B13′, and net tie line schedule signal lines C12, C13 and C13′ are provided, and net tie line flow signal lines B14, B15 and C15 are provided as well as conductors connecting various components, including conductors A41, A42, C41 and the like.

The cost signal lines B10, B11, C10, C11, the net tie line schedule signal lines B12, B13, B13′, C12, C13 and C13′, and if desired, the net tie line flow signal lines B14, B15, are advantageously connected between the respective systems through telemetering receivers and transmitters TRT as before.

Each of the systems is provided, as before, with deviation from schedule instruments ADS1, BDS1 and CDS1, controllers AC1, BC1 and CC1, system cost setters ASCS, BSCS and CSCS, and automatic system load control equipment, ASLC, BSLC, CSLC, of known type for its generating units to which the signal lines are connected.

Referring now more particularly also to FIGS. 6A, 6B, 6C and 6D of the drawings, portions of the circuits of FIG. 5 are there shown in detail for the interconnection of a plurality of, and specifically three systems.

The detailed circuitry will now be pointed out, reference being had to FIGS. 6A, 6B, 6C and 6D.

The net system tie line flow recorder TLFAB, for the systems A and B, in a specific embodiment, can advantageously be a null balance measuring instrument with a system A to system B net tie line flow retransmitting slide wire B108 with its movable contact B109, a tie line flow control slide wire B112 with its movable contact B113, a shaft B114 simultaneously driving the contacts B109 and B113, and a balancing motor B115 driving the shaft B114.

The slide wire B108 can have a D.C. source connected to its ends, with a polarity as indicated, and its midpoint connected to the tie line flow signal line B14. The movable contact B109 is connected to the tie line flow signal line B15. The slide wire B112 can have a D.C. source connected to its ends with a selected polarity disposition determined by the requirements of other equipment. The movable contact B113 is connected by a conductor B116 to a detector-amplifier B117 which drives the motor B115. The midpoint of the slide wire B112 is connected by the conductor B37 to the thermal converter TC for flow between the systems A and B (not shown in this figure). The detector amplifier B117 is also connected by the conductor B38 to the thermal converter TC (not shown). Export of power from system A to system B is indicated by counterclockwise movement of the shaft B114 from a position corresponding to the midposition of the contact B109 on the slidewire B108 and import of power by system A from system B is indicated by clockwise movement of the shaft B114 from the same position.

The net system tie line flow recorder TLFAC, for the systems A and C, in a specific embodiment, can advantageously be a null-balance measuring instrument with a system A to system C net tie line flow retransmitting slide wire C108 with its movable contact C109, a tie line flow control slide wire C112 with its movable contact C113, a shaft C114 simultaneously driving the contacts C109 and C113, and a balancing motor C115 driving the shaft C114.

The slide wire C108 can have a D.C. source, with a polarity as indicated, connected to its ends and its midpoint connected to the tie line flow signal line B15. The slide wire C112 can have a D.C. source connected to its ends with a selected polarity disposition determined by the requirements of other equipment. The movable contact C113 is connected at one end by a conductor C116 to a detector-amplifier C117 which drives the motor C115. The midpoint of the slide wire C112 is connected by the conductor C37 to the thermal converter TC for the power flow between the systems A and C (not shown). The detector amplifier C117 is connected by conductor C38 to the same thermal converter for the power flow between the systems A and C. Export of power from system A to system C is indicated by counterclockwise movement of the shaft C114 from a position corresponding to the midposition of the contact C109 on the slidewire C108 and import of power by system A from system C by clockwise movement from the same position.

The tie line schedule setter TLS1, in a specific embodiment, preferably includes a null-balance instrument of known type having a balancing slide wire A120 with its movable contact A121, a system B to A tie line schedule retransmitting slide wire A122 with its movable contact A123, a system A to B tie line schedule slide wire A124 with its movable contact A125, a shaft A126 simultaneously driving the contacts A121, A123, and A125, and a balancing motor A127 driving the shaft A126. The balancing slide wire A120 has its opposite ends connected to the conductors A45 and A47 and its contact A121 connected to the conductor A46.

The system B to A tie line schedule retransmitting slide wire A122 has a D.C. source with a polarity as indicated, connected to the opposite ends thereof, and the midpoint of the slide wire A122 is connected to the tie line schedule signal line B12. The contact A123 is connected to the tie line schedule signal line B13.

The system A to B tie line schedule slide wire A124 has a D.C. source, with a polarity as indicated, connected to its opposite ends, and the contact A125 is connected to the conductor A41 which leads to the tie line schedule setter TLS2. The midpoint of the slide wire A124 is connected to the conductor A42, which is connected to the deviation from schedule comparer, in the manner previously explained.

The balancing motor A127 is operated by the detector-amplifier A138 which is connected to the controller AC2, by conductors A48, A49 and A50 extending thereto. Counterclockwise movement of the shaft A126 from a position corresponding to the midposition of the contact A125 on the slidewire A124 corresponds to increase of export of power from the system A to system B while clockwise movement of the shaft A126 from the same position corresponds to increase of import of power to the system A from the system B.

An export limit switch A129 in the conductor A48 and an import limit switch A130 in the conductor A50, and operated at selected angular positions of the shaft A126 by a limit switch operator A131 limits the export from and import to system A.

The controller AC2, in a specific embodiment can be of known type, preferably identical to the controller AC2 previously described, and has proportional, reset and rate action. The controller AC2 includes a feedback bridge A133 and a control bridge A134. The feedback bridge A133 has the conductors A45 and A47 connected to two of its arms and the conductor A46 connected thereto. Each bridge A133 and A134 has a D.C. source with a selected polarity determined by the requirements of the equipment, has predetermined resistance R, and has proportional rheostats A135 and A136 which permit adjustment of the proportional action. Any unbalanced signal across the resistance A137, connected between the contacts of the rheostats A135 and A136, detected by the detector-amplifier A138 is effective therefrom as an output through conductors A48, A49 and A50 at the motor A127, depending upon the direction of unbalance. Reset action is supplied by the introduction of the capacitor A143 and adjustable resistor A139, and rate action is supplied by the resistors A140 and A141 and the capacitor A142 in the bridge circuit.

The control bridge A134 has the conductors A51 and A53 connected to two of its arms and the conductor A52 connected across.

The cost differential recorder CDAB, in a specific embodiment, preferably includes a null-balance instrument of known type having balancing cost control slide wire A144 with its movable contact A145, a cost retransmitting slide wire A146 with its moveable contact A147, a shaft A148 simultaneously driving the contacts A145 and A147, and a balancing motor A149 driving the shaft A148. The slide wire A146 is connected by the conductors A51 and A53 to legs of the control bridge A134 and the contact A147 is connected across the bridge A134. A detector-amplifier A150 is provided for driving the motor A149 and is connected by conductor A151 to the movable contact A145.

The midpoint of the slide wire A144 is connected by a conductor A152 to the conductor A55 and thence to the cost comparer CCAB.

The detector-amplifier A150 is also connected by a conductor A153 to the conductor A54 and thence to the cost comparer CCAB. Counterclockwise movement of the shaft A148 from a position corresponding to the midposition of the contact A145 on the slide wire A144 corresponds to high cost of system B and clockwise movement of the shaft A148 from the same position corresponds to high cost of system A.

The system load controller ASLC, as previously mentioned, can be of known type for distributing the load between the various generating units of the system A, and is connected to cost signal lines A10 and A11, and, as previously explained, to the cost setter ASCS for the system A.

The cost comparer CCAB, in a preferred embodiment, has the resistances A154 and A155 for systems A and B connected in series. The cost signal lines or conductors A10 and B10 are connected together at the junction of the resistances A154 and A155. The conductor A11 is connected to the outer end of the system A cost resistance A154. The conductor A54 is adjustably connected to the system A cost resistance A154. The conductor B11 is connected to the outer end of the system B cost resistance A155. The conductor A55 is adjustably connected to the system B cost resistance A155. The cost comparer CCAB thus provides for comparison of the incremental energy cost of each of the systems A and B.

The tie line schedule setter TLS2, in a specific embodiment, preferably includes a null-balance instrument of known type having a balancing slide wire C120, with its movable contact C121, a system C to A tie line schedule retransmitting slide wire C122 with its movable contact C123, a system A to C tie line schedule slide wire C124 with its movable contact C125, a shaft C126 simultaneously driving the contacts C121, C123 and C125 and a balancing motor C127 driving the shaft C126. The balancing slide wire C120 has its opposite ends connected to the conductors C45 and C47 and its contact C121 connected to the conductor C46.

The system C to A tie line schedule retransmitting slide wire C122 has a D.C. source with a polarity as indicated, connected to the opposite ends thereof, and the midpoint of the slide wire C122 is connected to the tie line schedule signal line C12. The contact C123 is connected to the tie line schedule signal line C13.

The system A to C tie line schedule slide wire C124 has a D.C. source, with a polarity as indicated, connected to its opposite ends, and the contact C125 is connected to the conductor C41 which connects to conductor B14 and thence to the net system tie line flow recorder TLFAB. The midpoint of the slide wire C124 is connected by the conductor A41 to the tie line schedule setter TLS1.

The balancing motor C127 is operated by the detector-amplifier C138 which is connected to the controller AC2C by the conductors C48, C49 and C50 extending thereto.

Counterclockwise movement of the shaft C126 from a position corresponding to the midposition of the contact C125 on the slide wire C124 corresponds to increase of export of power from the system C to system A while clockwise movement of the shaft C126 from the same position corresponds to increase of import of power to the system C from the system A.

An export limit switch C129 in the conductor C48 and an import limit switch C130 in the conductor C50 and operated at selected angular positions of the shaft C126 by a limit switch operator C131 limits the export from and import to system C.

The controller AC2C, in a specific embodiment, can be of known type, is preferably identical to the controller AC2 previously described, and has proportional, reset and rate action. The controller AC2C includes a feedback bridge C133 and a control bridge C134. The feedback bridge C133 has the conductors C45 and C47 connected to two of its arms and the conductor C46 connected thereto. Each bridge C133 and C134 has a D.C. source with a selected polarity determined by the requirements of the equipment, has predetermined resistances R, and has proportional rheostats C135 and C136 which permit adjustment of the proportional action.

Any unbalanced signal across the resistance C137, connected between the contacts of the rheostats C135 and C136, detected by the detector-amplifier C138 is effective therefrom as an output through conductors C48, C49 and C50 at the motor C127, depending upon the direction of unbalance. Reset action is supplied by the introduction of the capacitor C143 and adjustable resistor C139, and rate action is supplied by the resistors C140 and C141 and the capacitor C142 in the bridge circuit.

The control bridge C134 has the conductors C51 and C53 connected to two of its arms and the conductor C52 connected across.

The cost differential recorder CDAC, in a specific embodiment, preferably includes a null-balance instrument of known type having a balancing cost control slide wire C144 with its movable contact C145, a cost retransmitting slide wire C146 with its movable contact C147, a shaft C148 simultaneously driving the contacts C145 and C147, and a balancing motor C149 driving the shaft C148. The slide wire C146 is connected by the conductors C51 and C53 to legs of the control bridge C134 and the contact C147 is connected across the bridge C134. A detector-amplifier C150 is provided for driving the motor C149 and is connected by conductor C151 to the movable contact C145.

The midpoint of the slide wire C144 is connected by a conductor C152 to the conductor C55 and thence to the cost comparer CCAC.

The detector-amplifier C150 is also connected by a conductor C153 to the conductor C54 to the cost comparer CCAC. Counterclockwise movement of the shaft C148 from a position corresponding to the midposition of the contact C145 on the slidewire C144 corresponds to high cost of system C and clockwise movement of the shaft C148 from the same position corresponds to high cost of system A.

The system load controller for system C, as previously mentioned, can be of known type for distributing the load between the various generating units of the system C, and is connected to cost signal lines C10 and C11, and, as previously explained, to the cost setter for the system C.

The cost comparer CCAC in a preferred embodiment has resistances A154 and A156 for system A and C connected in series. The cost signal lines A10 and C10 are connected together at the junction of the resistances A154 and A156. The conductors A11 and C153 are connected as before to the system A cost resistance A154, and the conductors C55 and C11 are connected as before to the system C cost resistance A156. The cost comparer CCAC thus provides for comparison of the incremental energy cost of each of the systems A and C.

The tie line schedule setter TLS3 in a specific embodiment, preferably includes a null-balance instrument of known type having a balancing slide wire B120 with its movable contact B121, a system B to C tie line schedule retransmitting slide wide B122 with its movable contact B123, a system C to B tie line schedule slide wire B124 with its movable contact B125, a shaft B126 simultaneously driving the contacts B121, B123 and B125, and a balancing motor B127 driving the shaft B126. The balancing slide wire B120 has its opposite ends connected to the conductors B45 and B47 and its contact B121 connected to the conductor B46.

The system B to C tie line schedule retransmitting slide wire B122 has a D.C. source, with a polarity as indicated connected to the opposite ends thereof, and the midpoint of the slide wire B122 is connected to the tie line schedule signal line B13. The contact B123 is connected to the tie line schedule signal line B13'.

The system C to B tie line schedule slide wire B124 has a D.C. source, with a polarity as indicated, connected to its opposite ends, and the contact B125 is connected to the tie line schedule signal line C13'. The midpoint of the slide wire B124 is connected to the tie line schedule signal line C13.

The balancing motor B127 is operated by the detector-amplifier B138 which is connected to the controller AC2B by the conductors B48, B49 and B50 extending thereto.

Counterclockwise movement of the shaft B126 from a position corresponding to the midposition of the contact B123 on the slide wire B122 corresponds to increase of export of power from the system B to system C while clockwise movement of the shaft B126 from the same position corresponds to increase of import of power to the system B from the system C.

An export limit switch B129 in the conductor B48 and an import limit switch B130 in the conductor B50 and operated at selected angular positions of the shaft B126 by a limit switch operator B131 limits the export from and import to system B.

The controller AC2B, in a specific embodiment, can be of known type, is preferably identical to the controller AC2 previously described, and has proportional, reset and rate action. The controller AC2B includes a feedback bridge B133 and a control bridge B134. The feedback bridge B133 has the conductors B45 and B47 connected to two of its arms and the conductor B46 connected thereto. Each bridge B133 and B134 has a D.C. source with a selected polarity determined by the requirements of the equipment, has predetermined resistances R, and has proportional rheostats B135 and B136 which permit adjustment of the proportional action.

Any unbalanced signal across the resistance B137 connected between the contacts of the rheostats B135 and B136, detected by the detector-amplifier B138 is effective therefrom as an output through conductors B48, B49 and B50 at the motor B127, depending upon the direction of unbalance. Reset action is supplied by the introduction of the capacitor B143 and adjustable resistor B139, and rate action is supplied by the resistors B140 and B141 and the capacitor B142 in the bridge circuit.

The control bridge B134 has the conductors B51 and B53 connected to two of its arms and the conductor B52 connected across.

The cost differential recorder CDBC, in a specific embodiment, preferably includes a null-balance instrument of known type having a balancing cost control slide wire B144 with its movable contact B145, a cost retransmitting slide wire B146 with its movable contact B147, a shaft B148 simultaneously driving the contacts B145 and B147, and a balancing motor B149 driving the shaft B148. The slide wire B146 is connected by the conductors B51 and B53 to legs of the control bridge B134 and the contact B147 is connected across the bridge B134. A detector-amplifier B150 is provided for driving the motor B149 and is connected by conductor B151 to the contact B145.

The midpoint of the slidewire B144 is connected by a conductor B152 to the conductor B55 and thence to the cost comparer CCBC.

The detector amplifier B150 is also connected by a conductor B153 to the conductor B54 to the cost comparer CCBC. Counterclockwise movement of the shaft B148 from a position corresponding to the midposition of the contact B145 on the slidewire B144 corresponds to high cost of system C and clockwise movement of the shaft B148 from the same position corresponds to high cost of system B.

The system load controller for the system B, as previously mentioned, can be of known type for distributing the load between the various generating units of the system B, and is connected to cost signal lines B10 and B11, and, as previously explained, to the cost setter for the system B.

The cost comparer CCBC, in a preferred embodiment, has the resistances A155 and A156 for systems B and C connected in series. The cost signal lines B10 and C10 are connected together at the junction of the resistances A155 and A156. The conductors B11 and B54 are connected as before to the system B cost resistance A155, and the conductors B55 and C11 are connected as before to the system C cost resistance A156. The cost comparer CCBC thus provides for comparison of the incremental energy cost of each of the systems B and C.

The mode of operation is similar to that previously explained except that cost comparisons are made in pairs between each of the several systems, and these comparisons are utilized in a manner to be explained.

Assume first that the systems A, B and C are in operation, and in an equilibrium condition at a predetermined common incremental cost level. Cost signals for each of the systems are available to the cost comparers CCAB, CCAC and CCBC through the cost signal lines A10, A11, B10, B11, C10 and C11.

Since it is assumed initially that an equilibrium condition exists, the cost differential instruments CDAB, CDAC and CDBC are likewise in equilibrium so that no signals calling for any change are sent to the controllers AC2, AC2C or AC2B. The tie line schedule setters TLS1, TLS2, and TLS3 remain in their previously set condition, and the net system tie line flow recorders TLFAB, TLFAC do not change their condition.

If now, a change occurs in the load or generation conditions in one of the systems, so that its incremental cost has changed (cf. FIGS. 1A, 1B, 1C, 2A, 2B, 2C), this change can be reflected in various ways.

Assuming that such a change has occurred in one of the systems, the change will be available as a signal through the cost signal lines of that system and to the appropriate resistances of the respective cost comparers.

If the change is in either of the systems A or B, the operation will be similar to that previously described with the addition that the change is also made available for comparison with the signal from the system C, and thus is made available in the cost comparers CCAC or CCBC.

If, for example, a change occurred such that system A cost is above system B cost by the same amount system B cost is above system C cost then the following will obtain: the algebraic resultant of the signal developed by the tie line schedule setter TLS1, resulting from comparing system A and B costs in CCAB, and the tie line schedule setter TLS2 signal, resulting from comparing system A and C costs in CCAC, will be a signal of such magnitude and polarity as to cause the cost signal to system A to decrease. The algebraic resultant of the signal developed by the tie line schedule setter TLS1, resulting from comparing system B to A costs in CCAB, and the tie line schedule setter TLS3 signal, resulting from comparing system B to C costs in CCBC, will be a signal equal to zero and will not cause system B to change its cost. The algabraic resultant of the signal developed by the tie line schedule setter TLS2, resulting from comparing system C to system A costs in CCAC, and the signal from tie line schedule setter TLS3, resulting from comparing system C to system B costs in CCBC, will be a signal of such magnitude and polarity as to cause the cost signal to system C to increase. This will continue with system A decreasing its generation and increasing its imports while system C will increase its generation and increase its exports until systems A, B and C are at equal cost levels.

It will thus be seen that the system load controllers ASLC, BSLC and CSLC will be provided with appropriate signals as required to readjust the distribution, and as called for by cost signal comparisons which cost signals are continuously compared and the comparisons utilized.

We claim:

1. A system for controlling the power interchange among a plurality of tie line interconnected power systems comprising means for measuring the power flow over the tie lines between interconnected pairs of said power systems, means for each of said systems responsive to the net measured power flow over the tie lines connected to that power system for computing the change in generation required in that power system to establish said net measured power flow at a net scheduled value, first control means for each of said systems for producing in response to said computed change in generation required for that system an incremental power cost signal which varies until said computed change is reduced to zero, means for separately comparing said incremental power cost signals of interconnected pairs of power systems, second control means for at least one of said tie lines operable in response to differences in said compared incremental power cost signals to vary the scheduled value for the power flow over said tie line until said compared power cost signals are in predetermined relation, summing means for each of said power systems for summing said scheduled values of power flow for the tie lines connecting that power system to other of said power systems to produce said net scheduled value for that power system, and separate means each responsive to said incremental power cost signal for a corresponding one of said power systems for changing the generation in that power system so as to provide power therefrom at an incremental cost corresponding to said incremental power cost signal.

2. A system as defined in claim 1 in which said first and second control means each has both proportional and reset functions.

3. A system as defined in claim 1 in which said second control means has both proportional and reset functions.

4. A system for controlling the power interchange among a plurality of tie line interconnected power systems comprising means for measuring the power flow over the tie lines between interconnected pairs of said power systems, first control means for each of said systems responsive to the net measured power flow over the tie lines to that power system and to a net schedule value of power flow for producing an incremental power cost signal which varies until said measured value of power flow is at said scheduled value, means for separately comparing said incremental power costs of each power system of each of said interconnected pairs of power systems, second control means for at least one of said tie lines operable in response to differences in said compared incremental power cost signals to vary the scheduled value for the power flow over said tie line until said compared costs are in predetermined relation, summing means for each of said power systems for summing said schedule values of power flow for said tie line connecting that power system to other of said power systems to produce said net scheduled value for that system, and separate means each responsive to said incremental power cost signal for a corresponding one of said power systems for changing the generation in that power system so as to provide power therefrom at an incremental cost corresponding to said incremental power cost signal.

5. A system for controlling the power interchanged over tie lines interconnecting a plurality of power systems comprising means for establishing an incremental power cost signal for each of said power systems, means for comparing said signals for each interconnected pair of said power systems, means for producing a signal representing scheduled interchange over the tie lines between each connected pair of said power systems, means responsive to the difference signal obtained from each of said comparisons for varying said signal representing the scheduled interchange over the tie lines between each said interconnected pair of power systems, means for limiting the maximum value of said scheduled interchange signals established by said variations, means responsive to said scheduled interchange signals and to signals representing the corresponding measured interchange values for modifying by said first named means said incremental power cost signals, and means responsive to said incremental power cost signals for controlling the power generated, whereby said incremental power cost signals are varied as required to obtain said scheduled interchange over each of said tie lines within the limits of the capacity of said tie lines.

6. A system for controlling the power interchanged over tie lines interconnecting a plurality of power systems comprising means for establishing an incremental power cost signal for each of said power systems, means for comparing predetermined fractions of said signals for each interconnected pair of said power systems, means for producing a signal representing scheduled interchange over the tie lines between each connected pair of said power systems, means responsive to the difference signal obtained from each of said comparisons for varying said signal representing the scheduled interchange over the tie lines between each said interconnected pair of power systems, means for limiting the maximum value of said scheduled interchange signals established by said variations, means responsive to said scheduled interchange signals and to signals representing the corresponding measured interchange values for modifying by said first named means said incremental power cost signals, and means responsive to said incremental power cost signals for controlling the power generated, whereby said incremental power cost signals are varied as required to obtain said scheduled interchange over each of said tie lines within the limits of the capacity of said tie lines.

7. A system for controlling the power interchange among a plurality of power systems interconnected by tie lines comprising means for each system responsive to the deviation of the net tie line power flow into each of said systems from a scheduled net tie line power flow for the corresponding system for establishing an incremental cost signal for that system, means connected to said first named means for comparing the system incremental cost signals of each interconnected pair of said plurality of systems, feedback control means connected to said comparing means and responsive to said compared incremental cost signals for establishing scheduled tie line power flows into each of said power systems, said feedback control means including proportional, reset and rate functions, and means connected to said first named means and responsive to said incremental cost signals for changing the generation in said systems to provide power at an incremental cost corresponding to said incremental cost signal.

8. A system for controlling the power interchanged over tie lines interconnecting a plurality of power systems comprising means for establishing an incremental power cost signal for each of said power systems, means for comparing said signals for each interconnected pair of said power systems, said means for comparing said signals including a pair of interconnected resistances, one for each power system, across which a voltage conforming to the power cost signal from each said respective power system is applied, means for producing a signal representing scheduled interchange over the tie lines between each connected pair of said power systems, means responsive to the difference signal obtained from each of said comparisons for varying said signal representing the scheduled interchange over the tie lines between each said interconnected pair of power systems, means responsive to said scheduled interchange signals and to signals representing the corresponding measured interchange values for modifying by said first named means said incremental power cost signals, and means responsive to said incremental power cost signals for controlling the power generated, whereby said incremental power cost signals are varied as required to obtain said scheduled interchange over each of said tie lines within the limits of the capacity of said tie lines.

9. Apparatus for controlling power interchange between electric power systems based upon comparison of incremental costs of the respective power systems comprising cost signal generating devices for each power system supplying a voltage signal related to the incremental cost for said system, members for comparing the cost voltage signals of said power systems in pairs, members responsive to said cost comparing members for supplying differential voltage signals related to cost signal deviations, members for supplying voltage signals related to power flow between respective pairs of systems, signal producing means for comparing said power flow related signals with said deviations of cost signals, and control devices for each of said power systems for controlling generation at the respective systems, said control devices being controlled by said deviation related signals and in turn controlling said cost signal generating devices.

10. Apparatus as defined in claim 9 in which devices are provided for scheduling flow and include control cut-out means limiting the schedule of flow of power from one power system to another.

11. Apparatus as defined in claim 9, in which frequency responsive means responsive to the frequency of one of the power systems is provided connected to said cost signal generating device of said one of said power systems for modifying the action thereof.

12. The method of controlling power interchange between electric power systems based upon comparison of incremental costs of the respective power systems which comprises generating signals for each power system corresponding to the incremental power cost of the system, continuously comparing the cost signals for the systems, continuously measuring the power flow between respective power systems, continuously modifying the scheduled power flow between said power systems as determined by such comparison, and limiting the scheduled power flow from one power system to the other to a predetermined value.

13. Apparatus for controlling power interchange between electric power systems connected by tie lines based upon comparison of incremental costs of the respective power systems comprising cost signal generating devices for each power system supplying a signal related to the incremental cost for said power system, tie line schedule setters for each power system each having an output signal, means responsive to the net power flow from each power system each having an output signal, means for comparing the tie line schedule setter output signals and the net power flow output signals, said comparing means having a portion supplying a signal for modifying said incremental power cost signal, means for comparing the incremental power cost signals of said power systems in pairs, said cost signal comparing means having portions for maintaining the desired ratio of magnitudes of said cost signals being compared, and control devices for each power system for controlling generation at the respective power systems, said control devices being controlled by said incremental power cost signals.

14. Apparatus as defined in claim 13 in which said ratio maintaining portions maintain said ratio 1 to 1.

15. Apparatus for controlling power interchange between electric power systems connected by tie lines based upon comparison of incremental costs of the respective power systems comprising cost signal generating devices for each power system supplying a voltage signal related to the incremental cost for said power system, tie line schedule setters for each power system each having an output voltage signal, means responsive to the net power flow from each power system each having an output voltage signal, means for comparing the tie line schedule setter output voltage signals and the net power flow output voltage signals, said comparing means having a portion supplying a signal to said cost signal generating device to influence the output voltage signal of said device, means for comparing the incremental power cost signals of said power systems in pairs, said means having portions for maintaining the desired ratio of magnitudes of said cost signals being compared, control devices for each power system for controlling generation at the respective power systems said control devices being controlled by said incremental power cost signals.

16. Apparatus as defined in claim 15, including devices responsive to said differential voltage signal for producing tie line power flow scheduling voltage signals, devices for producing tie line power flow voltage signals responsive to flow of power over said tie lines, means for producing a voltage signal responsive to tie line power flow deviation from schedule, devices for producing a voltage signal responsive to frequency of one of said systems, a deviation from schedule comparer in which said tie line power flow deviation from schedule voltage signal and said frequency responsive voltage signal are compared to produce a voltage signal responsive to the comparison of said tie line power flow deviation from schedule voltage signal and said frequency responsive voltage signal, and a system cost setter controlled by the differential voltage signal output of said deviation from schedule comparer for producing a system cost voltage signal.

References Cited by the Examiner

UNITED STATES PATENTS

| | | | |
|---|---|---|---|
| 2,836,730 | 5/1958 | Early | 307—57 |
| 2,889,466 | 6/1959 | Brownlee | 307—57 |
| 3,117,221 | 1/1964 | Kirchmayer | 235—185 |
| 3,124,699 | 3/1964 | Kirchmayer | 307—57 |

LLOYD McCOLLUM, *Primary Examiner.*

L. R. CASSETT, *Assistant Examiner.*